United States Patent [19]

Jensen

[11] 4,211,546
[45] Jul. 8, 1980

[54] PROCESS FOR PREPARATION OF AMMONIUM POLYPHOSPHATE

[75] Inventor: William C. Jensen, Concord, Calif.

[73] Assignee: Western Farm Services Inc., Walnut Creek, Calif.

[21] Appl. No.: 948,722

[22] Filed: Oct. 5, 1978

[51] Int. Cl.$^2$ .............................................. C05B 7/00
[52] U.S. Cl. ............................................ 71/34; 71/43; 422/203; 423/313
[58] Field of Search .................... 422/203, 189, 231; 71/43, 34, 41, 42; 423/307, 310, 313

[56] References Cited

U.S. PATENT DOCUMENTS

| | | | |
|---|---|---|---|
| 2,047,394 | 7/1936 | Siems | 71/43 X |
| 3,153,578 | 10/1964 | Taylor | 423/313 X |
| 3,366,460 | 1/1968 | Christensen | 422/203 |
| 3,516,800 | 6/1970 | Yamamoto et al. | 422/203 X |
| 3,649,175 | 3/1972 | Legal | 71/43 X |
| 3,985,538 | 10/1976 | Hicks et al. | 71/43 X |
| 4,066,432 | 1/1978 | Jones | 71/43 X |

*Primary Examiner*—Kenneth M. Schor
*Attorney, Agent, or Firm*—Al A. Jecminek

[57] ABSTRACT

A process is described for the production of ammonium polyphosphate employing a novel reactor configuration and reaction technique to convert wet-process phosphoric acid having a low polyphosphate content and anhydrous ammonia into an ammonium polyphosphate product having a high proportion of the total $P_2O_5$ in the polyphosphate form while minimizing operational problems such as scale build up on the reactor walls and subsequent conversion of the polyphosphate formed to orthophosphate. In this novel reaction system, the heat of the exothermic ammoniation reaction is utilized to separately preheat all of the phosphoric acid reactant and a portion of the reactant ammonia through the use of a staged reaction zone including a first reaction stage comprising a jacketed free floating reaction tube having an inlet end which terminates inside the jacket and a second reaction stage comprising a vertically oriented reaction chamber equipped with an internal heat exchange coil and a sparger for injection of ammonia. The ammoniation reaction is carried out in this reaction system by injecting a portion of the reactant ammonia which has been preheated in the heat exchange coil of the second reaction stage into the first reaction stage via an injection tube which extends through the jacket into the inlet end of the reaction tube, said injection tube being sized to leave an annular space for fluid communication between the reactor tube and the jacket, and passing all of the phosphoric acid required for the final nitrogen to phosphate ratio into the jacket of the first reaction stage at a point remote from the inlet end of the reaction tube such that it is preheated by contact with a substantial portion of the external surface of the reaction tube and passes in preheated form into the reaction tube via the annular space between the ammonia injection tube and the reaction tube. In this reactor system, the remaining ammonia required for the final nitrogen to phosphate ratio is added to the second reaction stage via the sparger which also functions to agitate the reaction mass contained therein, thereby increasing heat transfer with the ammonia contained in the heat exchange coil. Finally, additional cooling of the reaction mass in the second reaction stage is provided by recycle of externally cooled reaction product.

5 Claims, 3 Drawing Figures

PROCESS FOR PREPARATION OF AMMONIUM POLYPHOSPHATE

BACKGROUND OF THE INVENTION

This invention relates to an improved process and reaction system for continuous production of liquid ammonium polyphosphate compositions. More particularly, this invention is directed to a novel reactor configuration and improved reaction technique for conversion of wet-process phosphoric acid having a low polyphosphate content into an ammonium polyphosphate product having a high proportion of the total $P_2O_5$ in the polyphosphate form by reaction with anhydrous ammonia in a continuous process employing a staged reaction zone in which the heat of the ammoniation reaction is utilized to preheat the reactants while minimizing scale build up on the reactor walls and reversion of polyphosphate to orthophosphate Ammonium polyphosphate based compositions are materials of commerce, having utility as fire retardants and fertilizers. In the fertilizer end use, where high analysis liquid or solid products are desired, it is advantageous and even essential that a major amount of the $P_2O_5$ be present as pyrophosphate and other longer chain phosphates for optimum handling properties in field applications. With high analysis ammonium polyphosphate fluids, the presence of this high proportion of condensed phosphates provides a stable liquid phase and enhances the sequestration capability of the composition when metal impurities and/or other additives such as micronutrients are present (as in blended formulations). With solid ammonium polyphosphate products, high polyphosphate contents provide improved control of crystal size which is inherently more variable and difficult to control in solid formulations containing large amounts of monoammonium phosphate and diammonium phosphate.

As a result of the foregoing and other incentives, extensive research has been carried out on techniques and process modifications for maximizing the polyphosphate content of the product obtained from the reaction between ammonia and phosphoric acid. Since wet-process phosphoric acid is an inexpensive and widely available source of raw material for this process, much of the published literature in this area of technology is directed to processes for increasing the polyphosphate content of the wet-process acid either before or during reaction with ammonia. This wet-process phosphoric acid is typically employed in a crude form and, as a result, it contains a variety of metal (iron, aluminum, etc.) impurities which can form troublesome deposits in processing equipment (pipeline reactors) and/or in the resultant ammonium phosphate solutions unless a high proportion of the $P_2O_5$ present is in the polyphosphate form.

Early attempts to maximize the polyphosphate content of ammonium phosphate based compositions involved adding super phosphoric acid or ammonium salts of super phosphoric acid to the wet process phosphoric acid ammoniation reaction system e.g. see U.S. Pat. Nos. 3,015,540 and 3,507,614 to Striplin. Another approach taken early on was to concentrate or remove water from merchant straight wet-process phosphoric acid i.e., orthophosphoric acid, via a separate evaporation step to provide a concentrated or super wet-process acid which could be ammoniated to form high analysis fertilizer base solutions in which deposit-forming metal contaminants are substantially or totally sequestered e.g. see U.S. Pat. Nos. 3,044,851 and 3,192,013 to Young. Subsequently, in U.S. Pat. No. 3,382,059 to Getsinger, it was disclosed that the autogeneous heat of reaction between anhydrous ammonia and wet-process phosphoric acid could be employed to condense the acid and form ammonium polyphosphate solutions directly without a separate heating and concentrating step.

Following the Getsinger patent disclosure of in situ dehydration or condensation of wet-process phosphoric acid using the autogeneous heat of the ammoniation reaction, a variety of processes and/or process modifications have appeared in the literature using this concept to advantage. Many of these processes employ a wet-process super phosphoric acid feed stock i.e., acid containing at least some superphosphoric acid, and optimize one or more of the reaction parameters-i.e. temperature, residence time, reactant mixing, weight ratios and the like—to maximize the polyphosphate content of the reaction product. U.S. Pat. No. 3,646,808 to Kearns, U.S. Pat. No. 3,503,706 to Legal, U.S. Pat. No. 3,695,835 to Kearns, U.S. Pat. No. 3,775,534 to Merline, U.S. Pat. No. 3,730,700 to Groenveld and U.S. Pat. No. 3,950,495 to Ries are examples of teachings in this general area of technology. In these and other disclosures it is common practice to carry out the ammoniation reaction in a pipeline or tubular reactor and, in some cases, a staged reaction system is usefully employed. U.S. Pat. No. 3,733,191 to Meline et al and Defensive Publication No. T909,016 to Mann disclose staged reaction systems which include pipeline reactors. In some cases one or both of the reactants (anhydrous ammonia and phosphoric acid) are preheated and, on occassion, the exothermic heat of the ammoniation reaction is used to advantage for this function. In this regard, U.S. Pat. No. 3,934,255 to Moore et al is of particular interest in that it teaches a continuous ammoniation process in which wet-process phosphoric acid containing at least 55% $P_2O_5$ and anhydrous ammonia are both at least partially preheated by indirect heat exchange with the reaction mass. While the Moore et al process apparently affords an ammonium polyphosphate melt having a sufficiently high proportion of the $P_2O_5$ present in the polyphosphate form that solids do not form in the reaction system or on conversion of the melt to high analysis solutions, the process is rather complex and expensive requiring three separate heat exchangers (two steam heated exchangers for initial heating of the reactants and one phosphoric acid-reaction product exchanger) in addition to a jacketed reaction zone for heat exchange between partially heated ammonia and the reaction mass.

From the foregoing it can be seen that continuous effort has been expended in the area of technology to improve and optimize the production of high analysis ammonium polyphosphate fluids from wet-process phosphoric acid. However, despite this effort and the multiplicity of process modifications which have resulted therefrom, a variety of process problems e.g. foaming, corrosion, solids deposition etc., and complexities still remain, depending on the process selected which provide incentive for further research in this technical area.

SUMMARY OF THE INVENTION

A new ammoniation process and reactor has now been discovered in which wet-process phosphoric acid having a low polyphosphate content and anhydrous ammonia can be efficiently preheated by the heat of the ammoniation reaction and continuously combined at high temperatures to afford an ammonium polyphosphate composition having a high proportion of the total $P_2O_5$ present in the polyphosphate form. This novel reaction system employs a staged reaction zone including a first reaction stage comprising a jacketed, free-floating tubular reactor in which all of the wet-process phosphoric acid required for the final nitrogen to phosphate ratio is preheated by indirect heat exchange with the ammoniation reaction mass and passed directly to the reaction tube with a portion e.g., up to 60%, of the anhydrous ammonia reactant required for the final nitrogen to phosphate ratio, being injected in preheated form into the tubular reactor at a point downstream from the inlet end of the tubular reactor. The design of this free floating tubular reactor is such that complete jacketing of the reaction pipe is provided while at the same time affording the reaction pipe a freedom to expand or contract with temperature changes without the use of expansion joints or other means of relieving thermal stresses. That is, the free floating tubular reactor is comprised of a bundle of longitudinally disposed tubes in an elongated tubular jacket, each tube being connected at least one end thereof to an adjacent tube by a tube connecting means e.g., as a tubular U-bend, such that single continuous flow passage is formed by the internal hollow portion of said tubes, the inlet end of said tube bundle being located inside the tubular jacket and the only outlet end being attached to the jacket. In this way the length of the initial zone reaction zone can be extended while the inlet end remains completely jacketed and free to expand or contract in response to changes in temperature. Anhydrous ammonia preheated in the second reaction stage (see below) is injected into the tubular reactor of the first reaction stage by means of an injection pipe which extends through the tubular jacket into the inlet end of the tubular reactor. This injection pipe has the same longitudinal axis as the tube making up the inlet end of the tubular reactor but is of smaller diameter such that an annular space is left between the tubular reactor and the injection pipe for fluid communication between the tubular reaction zone and the space defined by the tubular jacket. The jacket surrounding the tubular reactor is further provided with an inlet for unheated wet-process phosphoric acid. This inlet is located at a point on the jacket remote from the inlet end of the tubular reactor so that the phosphoric acid can contact a substantial portion of the external surface of the tubular reactor and be preheated by indirect heat exchange with the ammoniation reaction mass before it passes from the jacket into the tubular reactor via the annular space between the tubular reactor and the ammonia injection pipe. In this way, the vicous phosphoric acid reactant is efficiently preheated and the wall temperature of the tubular reactor is controlled over its entire length to avoid build up of scale which occurs if the wall temperature is allowed to rise too high.

The second reaction stage of this novel ammoniation reaction system is comprised of a vertically oriented reaction chamber which serves both to complete the ammoniation reaction under controlled conditions and to preheat the anhydrous ammonia reactant for the first reaction stage. The design of this second reaction stage is that of a simple vertically oriented reaction chamber positioned in close proximity to the first reaction stage such that the partially ammoniated reaction mass from the outlet end of the tubular reactor of the first reaction stage passes directly, without significant cooling to the lower portion of the second stage reaction chamber. An essential element of this second reaction stage is an internal heat exchange tube or coil which extends substantially into the ammoniation reaction mass and functions to preheat and/or vaporize the anhydrous ammonia reactant destined for the first reaction stage. The anhydrous ammonia required to complete the ammoniation reaction i.e., afford the final nitrogen to phosphate ratio, is added to the reaction mass in the second reaction stage by means of a sparger which extends into the reaction mass. The action of this ammonia sparger is beneficial in that it agitates the reaction mass and increases the heat transfer with the anhydrous ammonia contained in the internal heat exchange coil while at the same time increasing the pH of the product for polyphosphate retention on subsequent conversion of the reaction product to high analysis fertilizer fluids. Additional cooling of this second reaction stage is provided by recycle of externally cooled reaction product, said reaction product being withdrawn from the top of the vertical reaction chamber and recycled in cooled form to the bottom of the reaction chamber.

With the reactor and process of this invention, it is possible to maximize the ammoniation reaction temperature e.g. temperatures in the range of 320° to 370° C. being obtainable, through the use of preheated reactants while at the same time minimizing scale formation on reactor walls and avoiding thermal stresses which would otherwise shorten the life of the reactor. This high temperature reaction increases the condensation or dehydration of ortho phosphate to polyphosphates affording an ammonium polyphosphate reaction product having a high proportion e.g., up to 75%, of the $P_2O_5$ in the polyphosphate form.

Accordingly, the present invention includes a reactor for ammoniation of wet-process phosphoric acid to an ammonium polyphosphate having a high proportion of the total $P_2O_5$ in the polyphosphate form, said reactor being made up of:

(a) a first reaction stage comprising:
(1) an elongated tubular jacket containing a bundle of longitudinally disposed tubes, each tube being connected at least one end thereof to an adjacent tube by a tube connecting means such that a single continuous flow passage is formed by the internal hollow portion of said tubes and tube connecting means thereby providing a tubular reaction zone for cocurrent contacting and reaction of phosphoric acid and anhydrous ammonia, the inlet end of said tube bundle being located inside the tubular jacket and the outlet end of said tube bundle extending through and being affixed to said tubular jacket thereby providing an outlet for withdrawing the ammoniation reaction mass from the first reaction stage;
(2) an inlet for providing preheated, anhydrous ammonia to the tubular reaction zone, said inlet being in the form of a pipe which extends through the tubular jacket into the inlet end of the tube bundle, said pipe having the same longitudinal axis as, and a smaller diameter than, the tube portion making up the inlet end of the tube bundle such that an annular space is provided between the tube bundle and the ammonia inlet pipe for fluid communication between the tubular reaction zone and the space defined by the tubular jacket;

(3) an inlet for wet process phosphoric acid in the tubular jacket, said inlet being located remote from the inlet end of the tube bundle such that incoming phosphoric acid contacts a substantial portion of the external surface of the tube bundle and is thereby preheated prior to its entry into the tubular reaction zone via the annular space between the inlet end of the tube bundle and the ammonia inlet pipe; and (b) a second reaction stage comprising:

(1) a vertically oriented reaction chamber having an inlet in its lower portion for introduction of the ammoniation reaction effluent from the first reaction stage, said reaction chamber being closely connected to the first reaction stage by a conduit which provides fluid communication between the two reaction stages;

(2) a tubular heat exchanger means which extends substantially into the ammoniation reaction mass contained in the reaction chamber, said tubular heat exchange means being connected to an external source of liquid or vaporized anhydrous ammonia such that the ammoniation reaction mass contained in the reaction chamber is cooled by heat transfer through the heat exchanger wall and the ammonia coolant contained therein is vaporized and preheated;

(3) a means for sparging sufficient ammonia in liquid or vapor form required for the final nitrogen to phosphate ratio into the ammoniation reaction mass contained in the reaction chamber, said means being connected to an external source of ammonia and extending substantially below the surface of the ammoniation reaction mass in the reaction chamber wereby the pH of the ammoniation reaction mass is increased and the reaction mass is agitated for increased heat exchange with the ammonia contained in the tubular heat exchange; and (4) an inlet to the reaction chamber for the recycle of externally cooled ammoniated reaction product to the reaction chamber to control the temperature of the ammoniation reaction mass in the reaction chamber, said inlet being located in the lower portion of the reaction chamber such that the recycle product mixes with the ammoniation reaction effluent from the first reaction stage and flows vertically over the tubular heat exchanger and sparger prior to being discharged; and (5) an outlet in the reaction chamber for the ammoniated reaction product, said outlet being located in the upper portion of the reaction chamber at a point above the sparger and the major portion of the tubular heat exchanger; and (c) a conduit connecting the effluent end of the tubular heat exchanger means in the second stage reaction chamber and and anhydrous ammonia inlet pipe in the first reaction stage whereby preheated, anhydrous ammonia vapor can be passed to the first reaction stage.

Also within the scope of the present invention is a process for the production of ammonium polyphosphate which employs the above described staged reaction system to convert wet-process phosphoric acid and anhydrous ammonia to an ammonium polyphosphate having a high proportion of the total $P_2O_5$ in the polyphosphate form.

DESCRIPTION OF THE PREFERRED EMBODIMENTS

The wet-process phosphoric acid employed as a reactant in the process and reaction system of the present invention is suitably any commercial grade of wet process acid i.e., phosphoric acid derived from sulfuric acid promoted decomposition of phosphate rock, which contains from 67 to 72% $P_2O_5$ comprising ortho- and polyphosphoric acids. This commercial acid typically contains from about 1.8 to about 4% by weight of metal impurities—e.g., iron, aluminum, magnesium, calcium, potassium and sodium—expressed as their metal oxides. For best results it is preferred that the wet-process phosphoric acid reactant contain from about 10 to about 30% by weight polyphosphoric acids. Such acid can be obtained by concentrating crude wet-process phosphoric acid or by adding a minor amount of super phosphoric acid to the crude wet-process acid. The ammonia feedstock for the invention is suitably obtained from any commercial source of anhydrous or substantially anhydrous ammonia.

In its broadest sense, the process according to the invention is a stepwise, continuous procedure for the production of ammonium polyphosphate which employs the reaction system of the invention to convert wet-process phosphoric acid having a low polyphosphate content and anhydrous ammonia to an ammonium polyphosphate having a polyphosphate content which is sufficiently high to be emminently suited as a source of high analysis fertilizer fluids. This process includes the steps of:

(a) introducing a portion of the anhydrous ammonia, as a preheated vapor, into the wet-process phosphoric acid thereby forming an ammoniation reaction mass in a first reaction stage comprising a reaction tube or pipe contained in a tubular jacket, said reaction tube being positioned in the tubular jacket such that its inlet end terminates inside the jacket, said anhydrous ammonia being introduced into the reaction tube downstream from its inlet end by means of an injection tube disposed along the same longitudinal axis as the reaction tube, said injection tube having a smaller diameter than the reaction tube and extending into the reaction tube thereby forming tube an annular opening to the jacket between the injection tube and the reaction tube, said wet-process phosphoric acid being introduced without external preheating into the tubular jacket at a point remote from the inlet end of the reaction tube such that it contacts a sufficient portion of the external surface of the reaction tube to be preheated by indirect heat exchange with the ammoniation reaction mass and flows, in preheated form, through the annular opening between the ammonia injection tube and the reaction tube into the reaction tube, (b) passing the ammoniation reaction mass from the first reaction stage into a second reaction stage comprising a vertically oriented reaction chamber, said ammoniation mass being introduced into the lower portion of said reaction chamber, and adding to said ammoniation reaction mass sufficient anhydrous ammonia in a liquid or vapor form to bring the total nitrogen content of the ammoniation reaction mass to the final desired nitrogen to phosphate ratio while agitating the reaction mass, said anhydrous ammonia being introduced into the ammoniation reaction mass by means of a sparger extending from the top of the vertically oriented reaction chamber down into the ammoniation reaction mass, cooling said ammoniation reaction mass in said second reaction stage by indirect heat exchange will a second portion of anhydrous ammonia passed through a heat exchange coil or tube which is disposed inside the reaction chamber affording shell-side contact with the reaction mass, whereby said second portion of anhydrous ammonia is vaporized and preheated to a temperature desired for the preheated ammonia vapor reactant charge to the first reaction stage;

(c) transferring the second portion of anhydrous ammonia which has been vaporized and preheated by indirect heat transfer in the second reaction stage to ammonia injection tube of the first reaction stage thereby providing substantially all of the preheated ammonia reactant required for that reaction stage;

(d) recycling a portion of the reaction product, which has been cooled by outside means, to the lower portion of the second stage reaction chamber to control the temperature of the ammoniation mass in the chamber and the temperature of the second portion of anhydrous ammonia.

In the process according to the invention, the temperature to which the anhydrous ammonia and phosphoric acid are preheated by the exothermic ammoniation reaction will depend to a substantial degree on the maximum temperature desired in the first reaction stage. With the complete jacketing and freedom from thermal stresses provided by the free floating tubular reactor of the invention, this reaction temperature can suitably range between about 320° and about 370° C. with temperatures in the range of from 350° to 370° C. being preferred. Under these conditions, the wet-process phosphoric acid is suitably preheated to from about 90° to about 150° C. preferably to about 100° C. by indirect heat exchange with the ammoniation reaction mass in the jacket of the first reaction stage. Similarly the anhydrous ammonia feed to the first reaction zone is suitably preheated to a temperature in the range of from about 70° to about 150° C. in the internal heat exchange coil of the second reaction stage and preferably to about 120° C. prior to injection into the first reaction stage.

The residence time in the first reaction stage should not exceed about 35 seconds and suitably ranges between about 18 and about 28 seconds. It will be understood that the phosphoric acid feed to the jacket of the first reaction stage must be introduced at a rate and pressure sufficient to maintain a constant flow through the annular space between the tubular reactor and the ammonia injection pipe which is consistent with the desired reactant weight ratio in this first reaction zone. In this regard, the pressure in the first reaction stage is maintained at a low enough level to facilitate vaporization of water which is volatilized from the reactant feeds and released on conversion of orthophosphate to polyphosphate. Suitable reaction zone pressures range from about 1 to about 3 atmospheres. The quantity of anhydrous ammonia added to the phosphoric acid in this first reaction stage can vary within rather broad limits depending on the reaction temperature and final nitrogen to $P_2O_5$ weight ratio desired. Suitably, from about 60 to about 65% of the total ammonia reactant is added to this first reaction stage. After completion of the reaction in this first reaction stage, the partially ammoniated product is passed without significant cooling to the bottom of the second reaction stage.

The temperature of the reaction mass in the second reaction stage is controlled by a combination of direct heat exchange with recycled, externally cooled reaction product and indirect heat exchange with anhydrous ammonia contained in the internal heat exchange coil to afford a reaction temperature in the range of about 120° to about 150° C. This temperature range is high enough to inhibit reversion of polyphosphate to orthophosphate while the ammoniation reaction goes to completion. The amount of cooled reaction product which is recycled to the second reaction stage will depend on the temperature to which it is cooled and the temperature desired for the second stage reaction. The external cooling of this reaction product can be accomplished by a variety of conventional means e.g., tube and shell heat exchangers, spray towers, etc. One technique which is very usefully applied involves the employment of a larger volume post-reaction mix vessel in which the reaction product is given sufficient residence time to cool with or without supplemental cooling. Typically, the reaction product is cooled to a temperature in the range of from about 30° to about 40° C. and recycled such that the weight ratio of partially ammoniated reaction product to recycled reaction product charged to the second reaction stage is between about 1:3 and about 1:4. The pressure in this second reaction stage typically ranges between about 1 and about 2 atmospheres. Up to about 40% of the total anhydrous ammonia reactant required for the final nitrogen to phosphate weight ratio is added to this second reaction stage by means of a sparger which extends down from the top of the vertical reaction chamber into the reaction mass. As noted above, this sparging action of the ammonia agitates the reaction mass and increases heat transfer with the anhydrous ammonia contained in the internal heat exchange coil.

In a typical operation, the partially ammoniated reaction product from the first reaction stage enters the second reaction stage near the bottom of the vertically oriented reaction chamber where it contacts and is mixed with recycled reaction product. The cooled reaction mass then moves slowly upward in the reaction zone where it is agitated by and mixed with anhydrous ammonia to complete the ammoniation reaction. At about the same time, the agitated reaction mass flows vertically over the internal heat exchange coil containing anhydrous ammonia destined for the first reaction stage and, as a result, the reaction temperature is moderated while the anhydrous ammonia is vaporized and/or preheated. The fully ammoniated reaction product is then withdrawn from the top of the second reaction stage and can be readily converted to high analysis liquid fertilizer by adding the required amount of water for the desired analysis. The total residence time for the reaction mass in this second reaction stage typically ranges between about 2½ and 3 seconds. The total anhydrous ammonia charge to both reaction stages is suitably selected to afford an ammoniated polyphosphate concentrate having a nitrogen to phosphate weight ratio of about 1:3.4 to about 1:3.6. Under these conditions the pH of a final liquid fertilizer product will be between about 6.0 and about 6.5 and it will typically contain about 10 to 11% nitrogen and about 34 to 37% $P_2O_5$.

The invention will now be further elucidated with reference to the drawings which illustrate an embodiment of the two stage reactor according to the invention.

Figure 1:
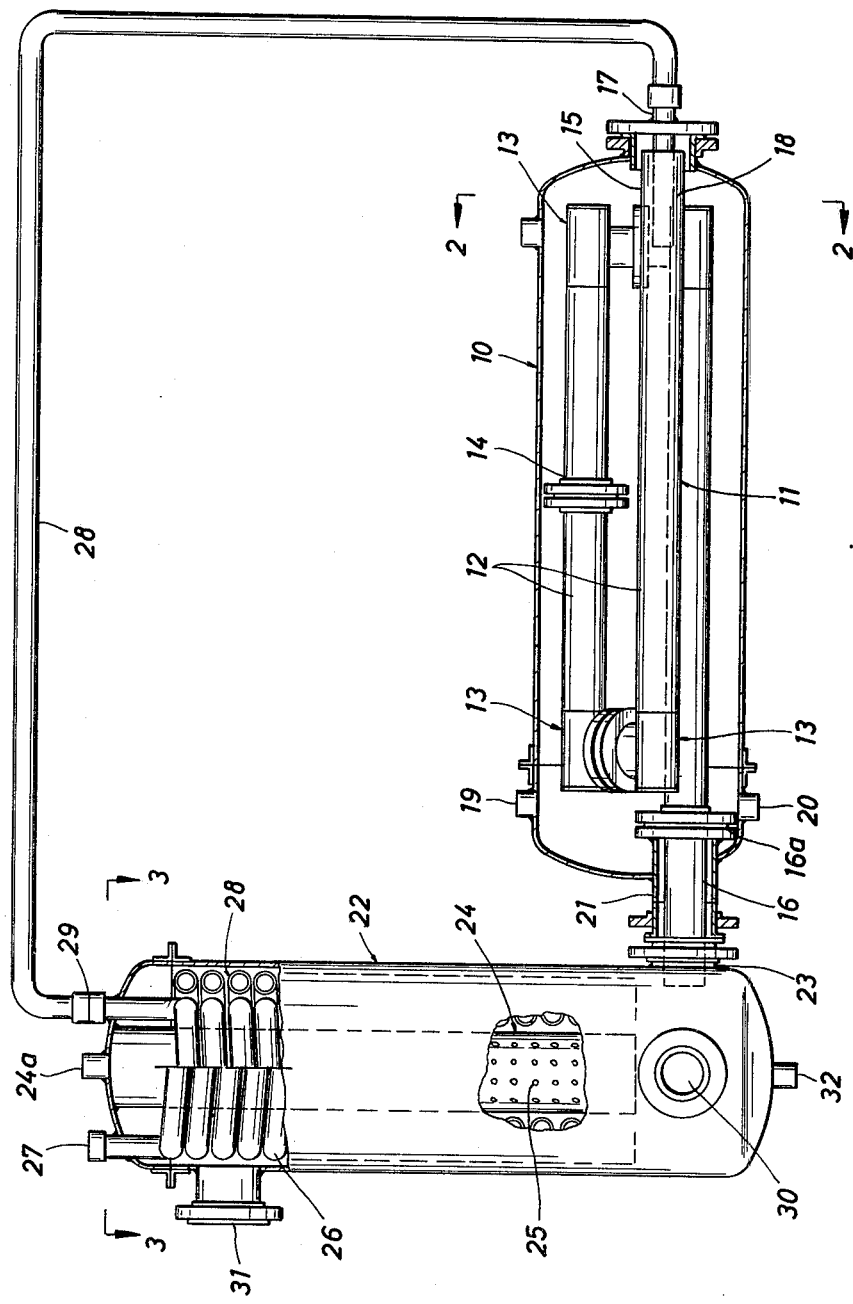
FIG. 1 is a side view of the staged reactor according to the invention taken in partial cross-section.
Figure 2:
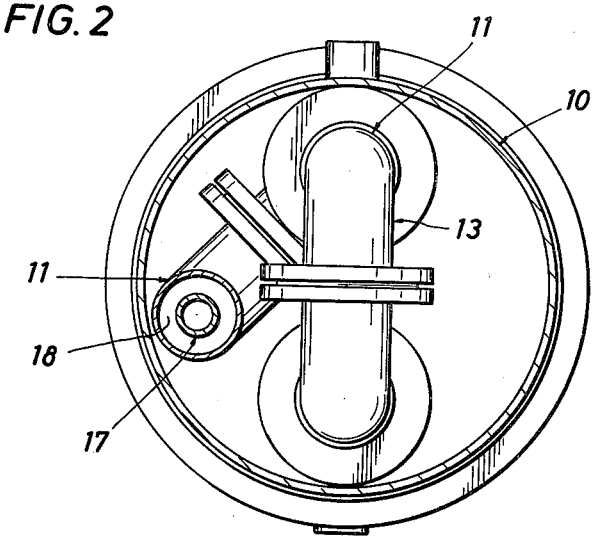
FIG. 2 is a partial sectional view of the first stage of the staged reactor from line 2—2 of FIG. 1.

Referring to FIG. 1, the first stage of the staged ammoniation reactor of the invention is defined by a tubular jacket, 10, which completely encloses a free floating tubular reaction zone designated generally by 11. This tubular reaction zone is comprised of a series of longitudinally disposed tubes, 12, which are connected at least one of their end portions to an adjacent tube by means of base joined tee joints 13, which are blinded off on one side of the tee and connected to one of the adjacent longitudinal tubes on the other side. In the present embodiment at least one of the longitudinal tubes making up the tubular reaction zone is divided by a flange, 14, to promote ease of construction. The bundle of longitudinally disposed tubes are end connected by the joints in such a way that a single continuous flow passage is formed through the tube bundle having an inlet 15 which terminates inside the tubular jacket and an outlet portion, 16, which extends through the jacket and is attached thereto at a point on the circumference of the tube by means of a flange, 16a. To facilitate the ammoniation reaction the first reaction stage is equipped with an anhydrous ammonia injection pipe, 17, which is affixed to and extends through the jacket 10, into the inlet end, 15, of the tubular reaction zone. This injection pipe has the same longitudinal axis as the tube portion making up the inlet end of the tubular reactor but is of smaller diameter such that annular space, 18, is provided for fluid communication between the jacket and the tubular reactor. This annular space may be better visualized by reference to FIG. 2 showing a cross-section of the reactor taken at the inlet end of the tubular reaction zone. The inlet for wet-process phosphoric acid, 19, on the jacket is located at a point remote from the inlet end of the tubular reactor such that the acid entering the jacket has an opportunity to contact a substantial portion of the external surface of the tubular reactor and be preheated prior to entry into the reactor tube via the annular space between the reactor tube inlet and the ammonia injection pipe. The jacket is also equipped with a drain, 20, for removal of acid in cases of servicing. After traveling several transverse paths through the adjacent longitudinal tubes making up the tubular reaction zone, the ammoniation reaction mass is discharged from the the outlet end, 16, of the tubular reactor which extends through a short conduit, 21, into the lower portion of the second reactor stage designated generally by 22, via a flanged inlet 23. With this inlet configuration, an annular space is provided between the tube, 16, making up the outlet end of the first tubular reaction zone and the conduit, 21, which is in fluid communication with the second reaction stage, 22. In this way, the entire length of the first stage tubular reactor is completely jacketed by the acid in the first stage, 10 and by the ammoniated reaction product along the outlet end, 16, which extends into the second reaction stage, 22.

Figure 3:
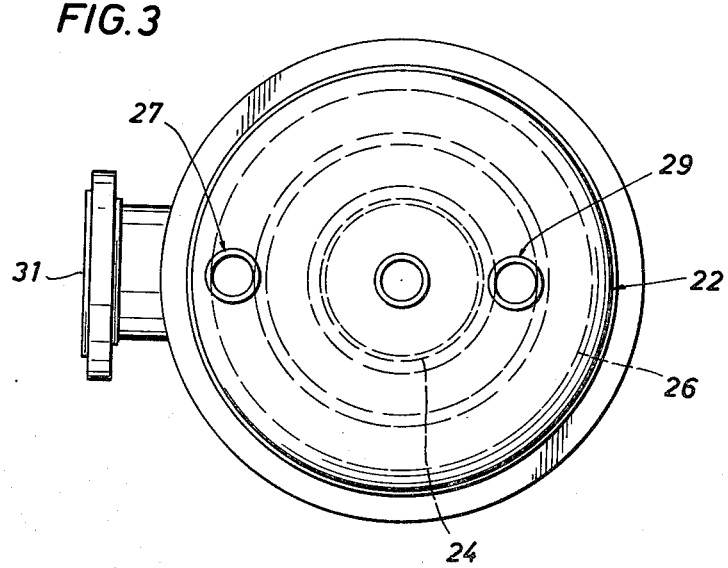
FIG. 3 is a top view of the second stage of the staged reactor from line 3—3 of FIG. 1.

The second stage of the staged ammoniation reactor of the invention is a vertically, oriented reaction chamber, 22, which is closely connected in its lower portion to the outlet of the first reaction zone by a conduit, 21, through which the discharge end, 16, of the first stage tubular reactor passes said conduit being flanged to the ammoniation reaction mass inlet, 23, in the reaction chamber, 22. This second reactor stage is equipped with an anhydrous ammonia sparger tube 24 which extends vertically downward from the top of the reaction chamber into the reaction mass. This sparger is connected to an external source of ammonia (not shown) at its upper end 24a and is penetrated on its bottom side and periphery with a multiplicity of equally spaced holes, 25, for injection of ammonia into the reaction mass. A further feature of the second reactor stage is an internal heat exchange coil, 26 (double coil in the embodiment shown) which extends downward from the top of the vertical chamber into the reaction mass. This heat exchange coil, which functions to preheat and vaporize the ammonia charge to the first reaction stage, is connected to an external source of ammonia at its inlet end, 27 and to the transfer conduit, 28, to the first reaction zone at its outlet end, 29. The arrangement of internal heat exchange coil inlet and outlet relative to the ammonia sparger inlet on the top of the second reaction stage is further illustrated by FIG. 3. The vertical reaction chamber making up the second reaction stage is further equipped with an inlet, 30, for recycle of cooled reaction product to the lower portion of the reaction chamber and an outlet, 31, for finished reaction product near the top of the reaction chamber. In the embodiment shown the second reactor state is also provided with an outlet, 32, at the bottom of the vertical reaction chamber for draining of the second reactor stage in the event servicing is required.

The materials used to construct the staged reactor of the invention include those metals and metal alloys conventionally employed in handling such corrosive materials. In this regard, a preferred material of construction is a stainless steel such as 316 stainless steel.

What is claimed is:

1. A process for the production of ammonium polyphosphate having a high proportion of the total $P_2O_5$ in the polyphosphate form which comprises reacting wet-process phosphoric acid having a low polyphosphate content with anhydrous ammonia under anhydrous conditions by:

(a) introducing a portion of the anhydrous ammonia, as a preheated vapor, into the wet-process phosphoric acid thereby forming an ammoniation reaction mass in a first reaction stage comprising a reaction tube or pipe contained in and completely enclosed by a tubular jacket, said reaction tube being positioned in the tubular jacket such that its inlet end terminates inside the jacket, and its outlet end extends through and is affixed to the jacket, said anhydrous ammonia being introduced into the reaction tube downstream from its inlet end by means of an injection tube which extends through the tubular jacket and is disposed along the same longitudinal axis as the reaction tube, said injection tube having a smaller diameter than the reaction tube end extending into the reaction tube thereby forming an annular opening to the jacket between the injection tube and the reaction tube, said wet-process phosphoric acid being introduced without external preheating into the tubular jacket at a point remote from the inlet end of the reaction tube such that it contacts a sufficient portion of the external surface of the reaction tube to be preheated by indirect heat exchange with the ammoniation reaction mass and flows, in preheated form, through the annular opening between the ammonia injection tube and the reaction tube into the reaction tube, (b) passing the ammoniation reaction mass from the first reaction stage into a second reaction stage comprising a vertically oriented reaction chamber, said ammoniation mass being introduced into the lower portion of said reaction chamber, and adding to said ammoniation reaction mass sufficient anhydrous ammonia in a liquid or vapor form to bring the total nitrogen content of the amnoniation reaction mass to the final desired nitrogen to phosphate ratio, said anhydrous ammonia being introduced into the ammoniation reaction mass by means of a sparger extending from the top of the vertically oriented reaction chamber down into the ammoniation reaction mass whereby the pH of the ammoniation reaction mass is increased and the reaction mass is agitated, cooling said ammoniation reaction mass in said second reaction stage by indirect heat exchange with a second portion of anhydrous ammonia passed through a heat exchange coil or tube which is disposed inside the reaction chamber affording shell-side contact with the reaction mass, wereby said second portion of anhydrous ammonia is vaporized and preheated to a temperature desired for the preheated ammonia vapor reactant charge to the first reaction stage;

(c) transfering the second portion of anhydrous ammonia which has been vaporized and preheated by indirect heat transfer in the second reaction stage to the ammonia injection tube of the first reaction stage thereby providing substantially all of the preheated ammonia reactant required for that reaction stage;

(d) recycling a portion of the reaction product, which has been cooled by outside means, to the lower portion of the second stage reaction chamber to control the temperature of the ammoniation mass in the chamber and the temperature of the second portion of anhydrous ammonia.

2. The process according to claim 1, wherein the temperature of the ammoniation reaction mass in the first reaction stage is maintained between about 320° and about 370° C. and the temperature of the ammoniation reaction mass in the second reaction stage is controlled between about 120° to about 150° C.

3. The process according to claim 2 wherein the phosphoric acid is preheated to a temperature in the range of about 90° to about 150° C. by indirect heat exchange with the ammoniation reaction mass in the first reaction stage and the anhydrous ammonia introduced into the first reaction stage is preheated to a temperature in the range of about 70° to about 150° C. by indirect heat exchange with the ammoniation reaction mass in the second reaction stage.

4. The process according to claim 3, wherein from about 60 to about 65% of the total ammonia reactant required to afford the final nitrogen to phosphate ratio is introduced in preheated form into the first reaction stage.

5. The process according to claim 4 wherein the final nitrogen to phosphate weight ratio in the reaction product is in the range of 1:3.4 to 1:3.6.

* * * * *